Aug. 19, 1958   A. J. CRITCHLOW   2,848,664
DIODE ARRAY
Filed Feb. 15, 1955

INVENTOR.
ARTHUR J. CRITCHLOW 2,848,664
Patented Aug. 19, 1958

2,848,664
DIODE ARRAY

Arthur J. Critchlow, Santa Clara County, Calif., assignor to International Business Machines Corporation, New York, N. Y., a corporation of New York Application February 15, 1955, Serial No. 488,362

9 Claims. (Cl. 317—231)

This invention relates to electrochemical diodes and more specifically to so-called diode matrices.

In computing devices frequently recourse is made to distribution networks which include diode connections for preventing conflicting back circuits. Normally these networks, sometimes referred to as matrices, employ a large number of single rectifying elements or diodes. In the present invention a multiple diode structure is provided which is less costly and readily adaptable to diode matrix utility.

It is accordingly the principal object of this invention to provide a multiple diode structure of novel construction and arrangement.

Another object of this invention is to provide an improved diode rectifier which is adapted for matrix application.

A further object of this invention is to provide a group of electrochemical diodes at the terminal junction between an electrode and a coacting electrolyte.

A still further object of the invention is to provide a multiplicity of electrochemical diodes in a container which has an electrolytic substance in channels and electrodes interconnecting the channels, in which the terminal junction between the electrodes and the electrolyte form a rectifying diode.

Other objects of the invention will be pointed out in the following description and claims and illustrated in the accompanying drawings which disclose, by way of example, the principle of the invention and the best mode which has been contemplated of applying that principle.

It has been found that electrochemical diodes are created by the combination of a tungsten wire in a nitric acid solution, the tungsten wires serving as the negative terminal or cathode of the diode. An acid resistant wire such as platinum or stainless steel is used for an anode. In such a device when a voltage is applied across the acid resistant anode and the tungsten cathode, current flows through the nitric acid electrolyte between the acid resistant anode and the tungsten cathode. The junction between the electrolyte and the tungsten has a high resistance to current flow in one direction and a much lower resistance to current flow in the other direction. A similar diode effect is obtainable by other combinations of electrodes and electrolytes, for example, a tantalum electrode and a phosphoric acid electrolyte will exhibit a similar action as will the combination of a tungsten wire electrode and an electrolyte of sodium hydroxide.

Figure 1:
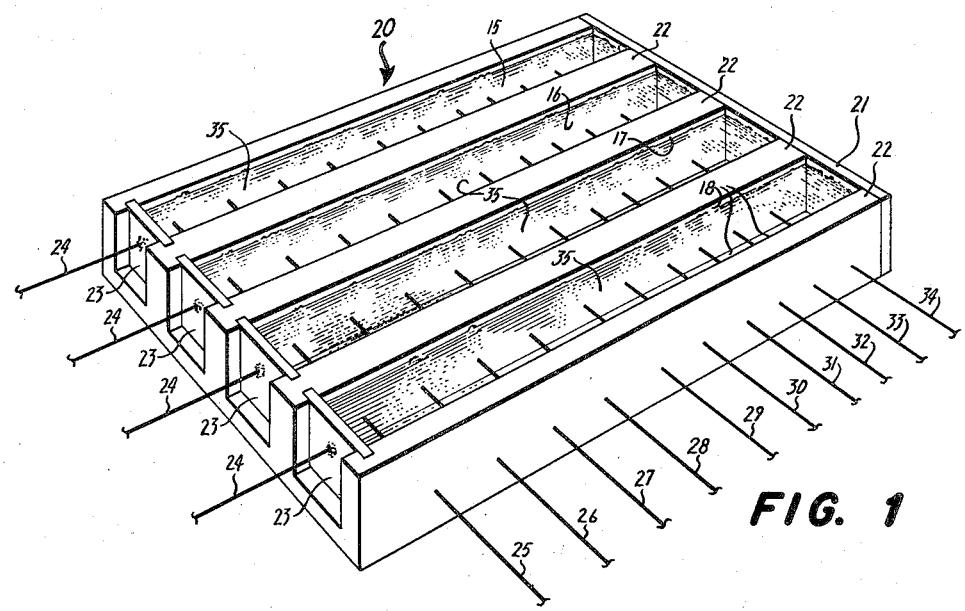
Fig. 1 is a perspective view of an embodiment of the invention.

In Fig. 1, a matrix for such electrochemical diodes is constructed employing a block 20 of vinyl chloride or other plastic which is both nonconductive and noncorrosive when subjected to the electrolyte to be used. The block 20 has a number of parallel walls 22 which form four channels 15, 16, 17, and 18. A plastic end piece 21 is placed at one end of all the channels and is sealed tightly to form a liquid-tight junction where the end piece 21 makes contact with the bottom of the block 20 and the walls 22. The other end of each individual channel is provided with an end piece 23 which is a conductive metal which is resistant to the electrolyte to be used in the channels. A terminal wire 24 is connected to each of the conductive end pieces 23 through which a current may pass to the end pieces. The junction between the end pieces 23, the bottom of the block 20, and the two walls 22 to which the end piece 23 is intimate are sealed to prevent any fluid leakage from a channel. Ten tungsten wires 25, 26, 27, 28, 29, 30, 31, 32, 33, and 34 are each arranged to pass through the walls 22 and enter the channels 15, 16, 17, and 18 near the bottom of the channels in a parallel planar spaced relationship to each other. The channels 15, 16, 17, and 18 are filled with a sufficient amount of an electrolyte 35 to completely cover all of the wires 25–34 running through each channel. Each wire is sealed where it passes through the walls 22 to prevent any liquid electrolyte in one channel from seeping into another channel. This electrolyte may be a solution such as nitric acid in its normal liquid form or may be of a paste-like consistency similar to the acid pastes commonly employed in circuit chargeable storage batteries by the addition of other commonly known ingredients. The electrolyte may also include a catalyst such as platinum black to slow down, recombine, or prevent decomposition of the electrolyte due to electrolysis.

In the arrangement of the electrolyte 35 and the wires 25–34 there is in effect a diode junction at the electrode formed by each wire 25–34 and the electrolyte 35 in each channel 15, 16, 17, and 18. The end piece 23 forms an anode to bring current into the electrolyte 35 via the terminal wire 24. Predetermined wires 25–34 may be coated with an insulating covering to completely insulate the wire from contact with the electrolyte 35 in predetermined channels. In this way where a wire is desired to form a cathode of a diode in a predetermined channel, the wire is left untouched, and where a diode is not desired, the wire is coated with an insulator. Through this technique, a great variety of logical matrix circuits can be established.

Figures 2, 3, 4:
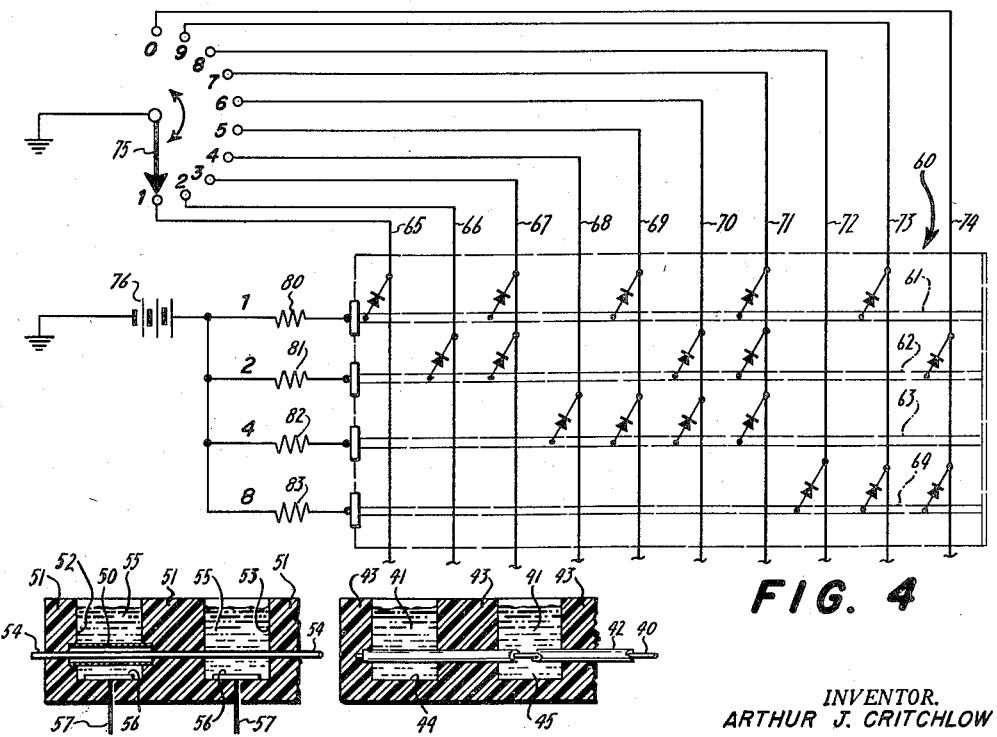
Fig. 2 is a sectional view of another embodiment.
Fig. 3 is a similar cross sectional view of still another embodiment.
Fig. 4 is a schematic view of a switching circuit employing the embodiment of Fig. 1.

Referring to Fig. 2, a way of insulating the wires to establish logical circuits is shown with a wire 40 made of a suitable metal to form a diode when in coaction with a suitable electrolyte 41. The wire 40 is insulated with an insulator 42 which is unaffected by the electrolyte 41 prior to its installation into walls 43 of electrolytic channels 44 and 45. A portion of the insulator 42 is removed where the wire 40 enters the channel 45 only, thereby allowing a diode junction to exist between the electrolyte 41 and an electrode formed between wire 40 in the channel 45; and no electrical interaction can exist between electrolyte 41 in the channel 44 and the wire 40 by reason of the previously installed insulator 42.

In Fig. 3, a similar controlled logic is obtained by providing a nonconductive tubing 50 which interconnects walls 51 of a channel 52. A wire 54 made of a suitable material to provide a diode reaction with an electrolyte 55 extends through the channel walls 51 and through the tubing 50 into the electrolyte 55 in a channel 53. A diode junction can only exist between the electrode created by the wire 54 in the channel 53 and the electrolyte 55 and cannot form a diode junction with the electrolyte 55 in the channel 52 by virtue of the insulating tubing 50 provided.

Still another way of selecting channels in which a diode action would take place would be by a printing circuit technique wherein wires are painted or plated with an insulating coating at predetermined positions where an insulation is desired prior to being submerged in the electrolytic solution.

In Fig. 3, the anode for the acid channels 52 and 53 is made by a bottom plate anode 56 which runs the entire length of the channels. Electrical connections to the anode 56 are made by a terminal wire 57 which passes through the bottom wall of the channels.

Referring to Fig. 4, a circuit is provided employing an electrochemical matrix 60 substantially similar to the electrochemical matrices described above in connection with Fig. 1. The matrix 60 has channels 61, 62, 63, and 64 containing an electrolyte which is suitable to coact with electrodes formed by wires 65, 66, 67, 68, 69, 70, 71, 72, 73, and 74 which run through each of the channels 61–64. A stepping switch armature 75 is arranged to selectively connect one of the wires 65–74 to the negative terminal of a D. C. power supply 76. The positive terminal of the power supply connects through a load resistor 80 to the acid channel 61, load resistor 81 to the acid channel 62, load resistor 82 to acid channel 63, and load resistor 83 to acid channel 64.

The logical circuit is established by the wire 65 being insulated from the electrolyte in channels 62, 63, and 64, therefore providing an electrode to form a diode in only channel 61. The wire 66 is insulated to have a diode reaction only with channel 62. The wire 67 has a diode reaction with channels 61 and 62, wire 68, a reaction with channel 63, wire 69, a reaction with the channels 61 and 63, wire 70, a reaction with the channels 62 and 63, wire 71, a reaction with the channels 61, 62, and 63, wire 72, a reaction with the channel 64, wire 73, a reaction with the channels 61 and 64, and the wire 74 reacts with the channels 62 and 64. The resistors 80, 81, 82, and 83 have a resistance which is considerably greater than the resistance through the diode junctions to current flow in the wrong direction. It is apparent in this circuit that when the armature 75 is connected to wire 65 that there is a diode reaction between channel 61 and the wire 65 which will cause a high voltage drop across the resistor 80, while the voltage drop across the three remaining resistors 81, 82, and 83 will be relatively low. When the voltage drop across the resistor 80 is made to represent a binary number 1, the voltage drop across the resistor 81, a binary number 2, the voltage drop across the resistor 82, a binary number 4, the voltage drop across the resistor 83, a binary number 8, and the wires 65–74 represent the decimal numbers 1 through 9 and zero, respectively, this circuit functions as a decimal to binary converter, the diode junctions functioning as switches and back circuit eliminators to supply one or more of the channels 61–64 with current flow. It is clear that this circuit is only illustrative of the myriad of other circuit possibilities using this invention.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrochemical diode having individual channels, said channels containing an electrolyte, a plurality of wires entering said electrolyte in each channel, said wires being of a material which will react with the electrolyte to provide a high resistance to current flow through the wires and the electrolyte in one direction and a low resistance to current flow in the other direction, and means for electrically insulating predetermined said wires from the electrolyte in predetermined said channels.

2. An electrical distribution structure having a plurality of channels, an anode for each said channel, a plurality of independent cathodes associated with all said channels, an electrolyte in each said channel, said electrolyte being in contact with the corresponding anode and the corresponding cathodes, and said electrolyte and cathodes being of a suitable material to allow current to pass from an anode to a cathode more readily than from a cathode to an anode.

3. An electrochemical diode matrix having independent parallel channels, each channel containing an electrolyte, a plurality of first electrodes, each of which is associated with all of said channels and making contact with the electrolyte therein, means for electrically insulating said first electrodes from the electrolyte in predetermined channels, a plurality of second electrodes associated with corresponding channels and making contact with the electrolyte therein, and a voltage input across said first and said second electrodes whereby current will flow in one direction through said channels between said second electrodes and uninsulated ones of said first electrodes when voltage is placed thereacross.

4. An electrical distribution structure having a plurality of parallel channels, a plurality of conductors transversely entering said channels, an electrolyte for said channels, said conductors and said electrolyte being of suitable composition to form a rectifying action to the passage of an electrical current between said conductors and said electrolyte, a second conductor associated with each channel and in contact with the electrolyte therein, said second conductors being of material which will not chemically react with said electrolyte, and means for insulating selected first conductors from selected channels whereby predetermined electrical paths remain between second conductors and nonselected first conductors.

5. An electrical distribution structure having a plurality of independent channels, a different anode for each channel, a plurality of independent cathodes, each said cathode being associated with said channels, an electrolyte for each said channel in contact with said corresponding anode and with all said cathodes in each said channel, said electrolyte and said cathodes being of a suitable material to allow current to pass from an anode to the corresponding cathodes more readily than from these cathodes to that anode, and means for electrically insulating selected cathodes from the electrolyte in selected channels whereby electrical paths between anodes and cathodes is determined according to said insulation.

6. An electrical distribution structure having a plurality of parallel channels, electrical insulating walls separating each said channel, each said channel carrying a solution of nitric acid, a plurality of tungsten wires extending through the solution in each said channel, means for providing contacts between selected wires and the nitric acid in selected channels, and means for supplying a voltage across said nitric acid in one of said channels and one of said selected wires in each said channel whereby individual rectifiers are established at said contacts.

7. An electrical distribution structure comprising a plurality of parallel channels, electrical insulating walls separating each said channel, each said channel carrying a solution of nitric acid, a plurality of tungsten wires arranged transversely with respect to each said channel, said wires having an insulating coating to prevent contact of the wire with the nitric acid in selected channels, and being arranged to contact the nitric acid in others of said channels, and means for supplying a current through said nitric acid and said contacting wires in each channel whereby individual rectifiers are established at said contacts.

8. An electrical distribution device comprising a plurality of first electrodes, an independent electrolyte associated with each said electrode, and a plurality of second electrodes associated with all of said electrolytes, selected second electrodes being insulated from selected electrolytes, whereby electrical paths are present between each first electrode and second electrodes not insulated from the corresponding electrolyte.

9. The invention set forth in claim 8 wherein said electrolytes and said electrodes coact in such a way that said paths have a high resistance in one direction and a low resistance in the other.

References Cited in the file of this patent

UNITED STATES PATENTS

| | | |
|---|---|---|
| 1,186,747 | Chubb | June 13, 1916 |
| 1,572,560 | Rarick | Feb. 9, 1926 |
| 1,682,846 | Kremers | Sept. 4, 1928 |
| 2,070,343 | Turnock | Feb. 9, 1937 |

FOREIGN PATENTS

| | | |
|---|---|---|
| 758,836 | France | Jan. 24, 1934 |

OTHER REFERENCES

Ser. No. 262,800, Wolff (A. P. C.), published May 18, 1943.